United States Patent
Lee

(10) Patent No.: US 7,590,431 B2
(45) Date of Patent: Sep. 15, 2009

(54) SYSTEM AND METHOD FOR OUTPUTTING DUAL VOICE OF MOBILE TERMINAL

(75) Inventor: Hun-Soo Lee, Suseong-Gu (KR)

(73) Assignee: LG Electronics Inc., Seoul (KR)

( * ) Notice: Subject to any disclaimer, the term of this patent is extended or adjusted under 35 U.S.C. 154(b) by 577 days.

(21) Appl. No.: 10/996,608

(22) Filed: Nov. 26, 2004

(65) Prior Publication Data

US 2005/0130719 A1    Jun. 16, 2005

(30) Foreign Application Priority Data

Nov. 27, 2003    (KR)    .................. 10-2003-0085239

(51) Int. Cl.
*H04M 1/00*    (2006.01)
(52) U.S. Cl. ............. 455/569.1; 455/575.1; 455/575.3
(58) Field of Classification Search .......... 455/569.1, 455/575.1, 575.3, 550.1, 90.3, 575.8, 73
See application file for complete search history.

(56) References Cited

U.S. PATENT DOCUMENTS

| 6,549,789 | B1 | 4/2003 | Kfoury | |
|---|---|---|---|---|
| 6,731,959 | B1 * | 5/2004 | Kumagai et al. | 455/575.3 |
| 6,944,484 | B2 * | 9/2005 | Yasuda | 455/575.3 |
| 7,242,971 | B2 * | 7/2007 | Park | 455/574 |

FOREIGN PATENT DOCUMENTS

| CN | 1243375 | 2/2002 |
|---|---|---|
| CN | 1426631 | 6/2003 |
| JP | 2001-060994 | 3/2001 |
| JP | 2002-171189 | 6/2002 |
| KR | 2003-0068664 | 8/2003 |

OTHER PUBLICATIONS

Chinese Office Action dated Sep. 8, 2006.

* cited by examiner

*Primary Examiner*—Sonny Trinh
(74) *Attorney, Agent, or Firm*—Ked & Associates LLP

(57) ABSTRACT

A dual voice outputting system of a folder type terminal having a cover part and body part connected via a hinge. The system includes a first output device positioned at a front side of the cover part and configured to output a received voice or sound, a second output device positioned at a rear side of the cover part and configured to output the received voice or sound, a rotation sensing unit configured to check a rotated state of the cover part, and a controller configured to output the received voice or sound to the first or second output device based on the checked rotated state of the cover part when a user responds to an incoming call.

27 Claims, 6 Drawing Sheets

FIG.2
BACKGROUND ART
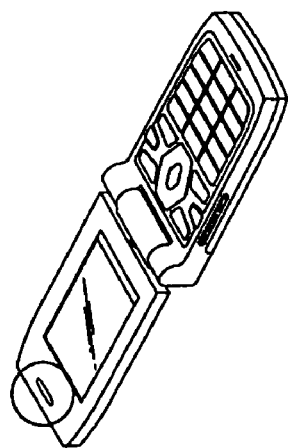
Rear side opened state
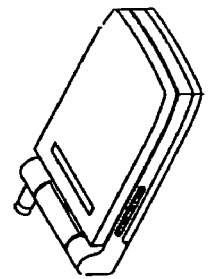
front side closed state
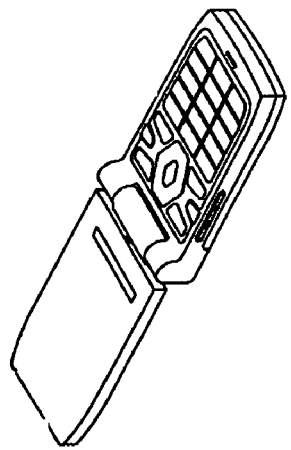
Rear side opened state
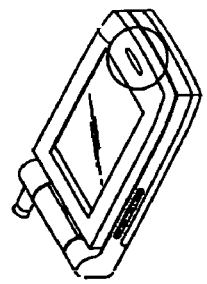
Rear side closed state closed state opened state Call available state

SYSTEM AND METHOD FOR OUTPUTTING DUAL VOICE OF MOBILE TERMINAL

CROSS-REFERENCE TO A RELATED APPLICATION

This application claims priority to Korean Patent Application No. 85239/2003 filed on Nov. 27, 2003, the entire contents of which is hereby incorporated in its entirety.

BACKGROUND OF THE INVENTION

1. Field of the Invention

The present invention relates to a mobile terminal, and more particularly to a folder type mobile terminal having an output device/speaker/receiver positioned on both a front and rear side of a cover part of the terminal.

2. Background of the Related Art

A mobile terminal is generally divided into a stick type, a flip type, a slide type and a folder type. The folder type mobile terminal includes a covet part that rotates or swivels via a hinge connecting the cover part to the main body of the terminal.

For example, FIG. 1 illustrates a folder type mobile terminal with a cover part 200 that can be rotated about its axis. The cover part 200 may also be folded and unfolded with respect to a main body part 100. As shown, the folder type mobile terminal includes the cover part 200 having a display unit 210 and a receiver 10, the main body part 100 having a key pad, and a hinge part 300 connecting the cover part 200 and the body part 100. Note the hinge part 300 includes a swivel 310 allowing the cover part 200 to rotate by 180° clockwise or counterclockwise about its longitudinal axis. The cover part 200 may also be folded and unfolded with respect to the main body part 100.

Next, FIG. 2 illustrates different open and closed states of the folder type mobile terminal. For the sake of explanation, the opened or closed states of the folder type mobile terminal are defined with respect to a rotational state of the cover part 200 as follows.

First, regarding the cover part 200, the side on which the display unit 210 (see FIG. 1) is mounted is a front side and the opposite side is a rear side. Further, a state in which an angle between the cover part 200 and the body part 100 widens at its maximum is defined as an 'opened state,' while a state in which the cover part 200 covers the body part 100 is defined as a 'closed state.'

Further, because the cover part 200 can swivel about the main body part 100, there are four additional states as follows and as shown in FIG. 2: 1) when the mobile terminal is opened with the cover part 200 rotated by 180°, this state is defined as a 'rear side opened state'; 2) when the mobile terminal is closed with the cover part 200 rotated by 180°, this state is defined as a 'rear side closed state'; 3) when the mobile terminal is opened with the cover part non-rotated, this state is defined as a 'front side opened state'; and 4) when the mobile terminal is closed with the cover part non-rotated, this state is defined as a 'front side closed state.'

Turning now to FIG. 3, which illustrates an operational process of the related art mobile terminal for answering a phone call in the 'rear side closed state.' When a base station initiates a call through a paging channel, the mobile terminal rings or vibrates to inform a user about the phone call and then the user then opens the cover part 200 or presses an arbitrary button (call button) to answer the call. Note in this example, it is assumed the user answers the call when the cover part 200 is opened.

As shown in FIG. 3, when the mobile terminal is in the 'rear side closed state,' the user answers the incoming call using the following two procedures: first, the user opens the cover part 200 of the mobile terminal (rear side closed state→rear side opened state); and second, the user swivels or rotates the cover part 200 by 180° (rear side opened state→front side opened state). Thus, with these operations, the mobile terminal is in a call available state and the user can communication with the caller.

In addition, because the receiver 10 is provided at the front side of the cover part 200, the user can communicate with the caller only when the mobile terminal is in the front side opened state. Thus, if a call is received when the mobile terminal is in the rear side closed state, the user must perform the two-step manipulation as discussed above (namely, rear side closed state→rear side opened state, rear side opened state→front side opened state). Further, during the second manipulation (rear side opened state→front side opened state), the user needs to use both hands, which is very inconvenient and quite troublesome especially when the user is performing another operation such as driving a car.

SUMMARY OF THE INVENTION

Accordingly, one object of the present invention is to at least address the above-noted and other problems.

Another object of the present invention is to allow a user to communicate with the calling party with a cover part of a mobile terminal in a rotated state or in a non-rotated state.

To achieve at least the above objects in whole or in parts, the present invention provides novel a dual voice outputting system of a folder type terminal having a cover part and body part connected via a swivel hinge. The system includes a first output device positioned at a front side of the cover part and configured to output a received voice or sound, a second output device positioned at a rear side of the cover part and configured to output the received voice or sound, a rotation sensing unit configured to check a rotated state of the cover part, and a controller configured to output the received voice or sound to the first or second output device based on the checked rotated state of the cover part when a user responds to an incoming call.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 illustrates overviews of a folder type mobile terminal in opened and closed states;

BEST MODE OF THE INVENTION

Figure 1:
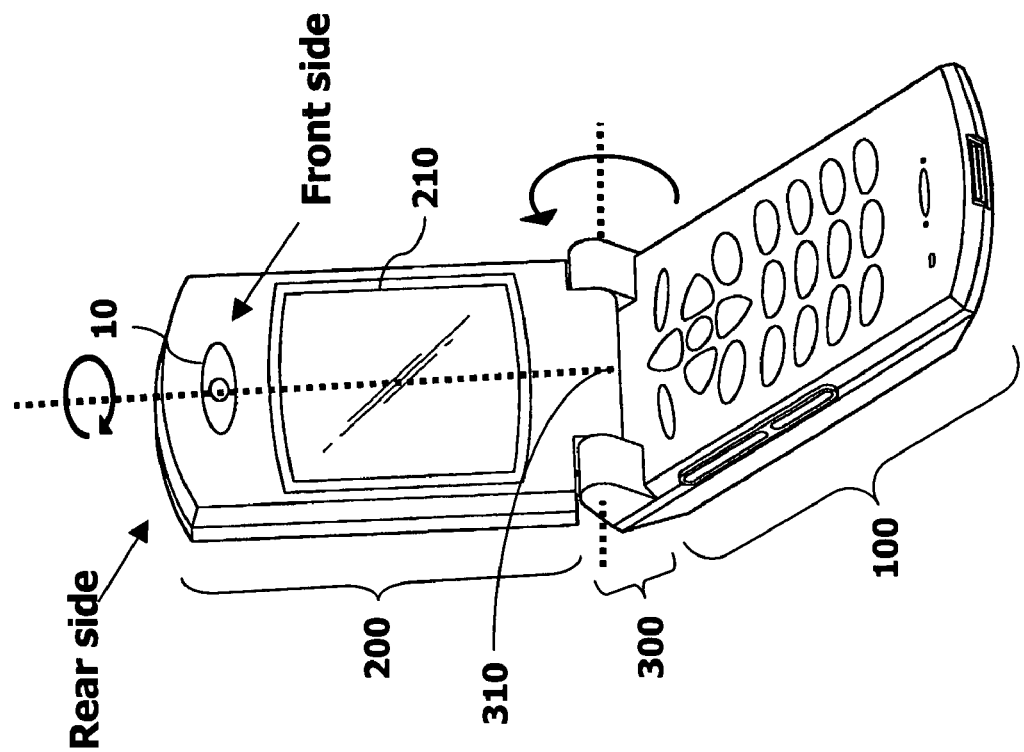
FIG. 1 is an overview illustrating a related art folder type mobile terminal.
Figure 3:
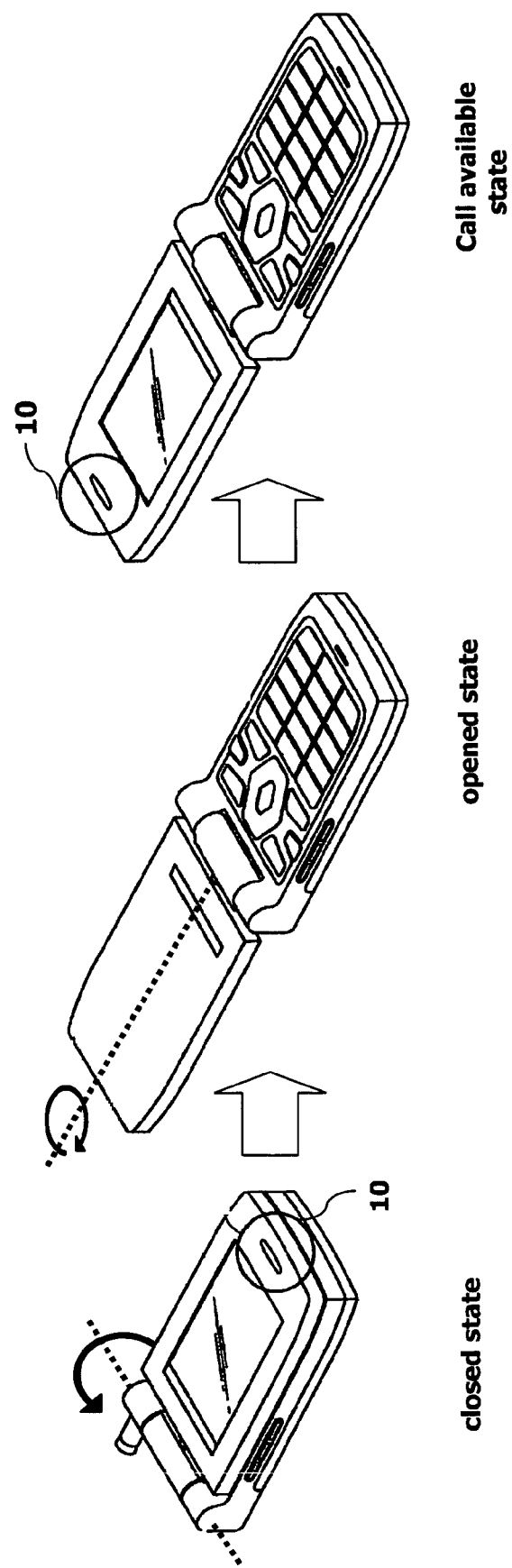
FIG. 3 is an overview illustrating a process of answering a call with the related art mobile terminal.
Figure 4:
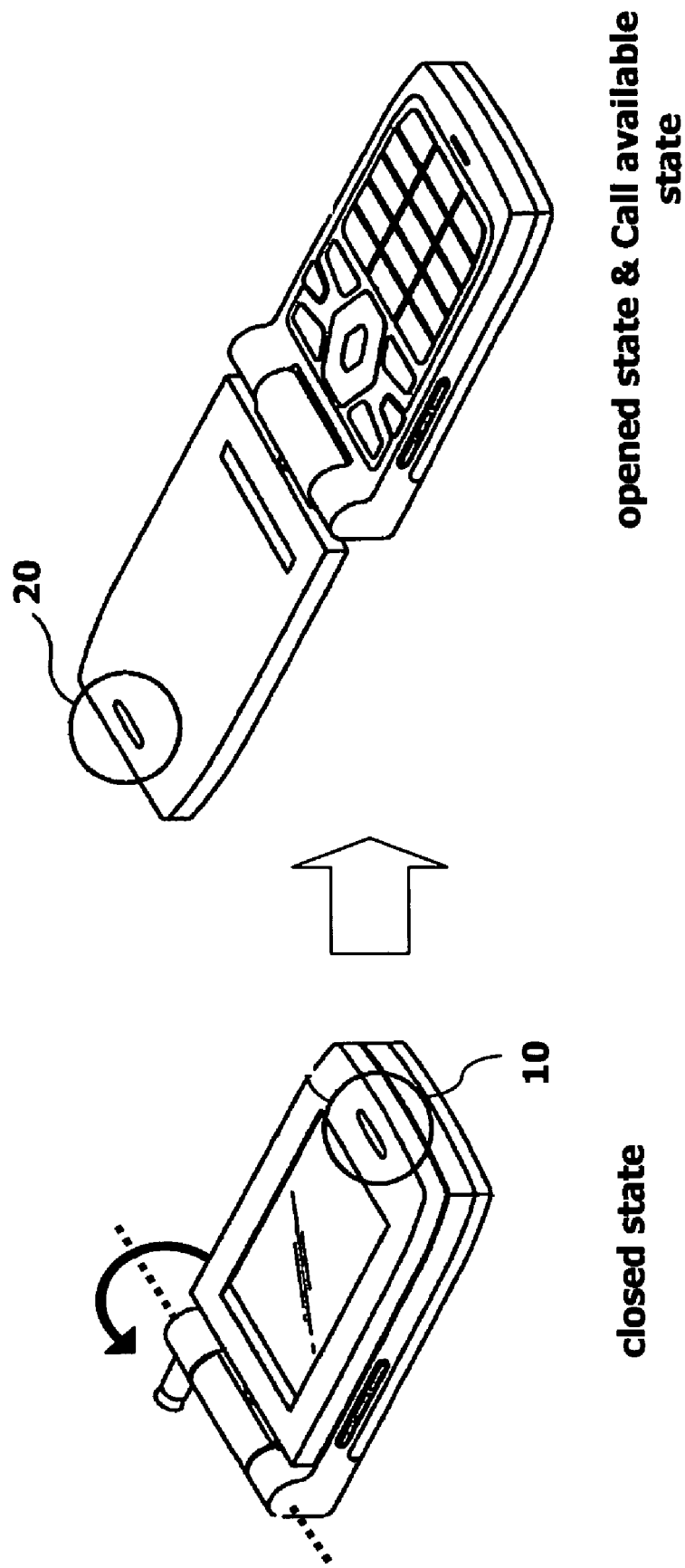
FIG. 4 is an overview of a manipulation process of a mobile terminal according to the present invention.

Referring now to the drawings, the present invention will be described. FIG. 4 illustrates a manipulation process of a mobile terminal according to the present invention. As shown, the user can communicate with the caller even when the mobile terminal is in the rear side opened state via a speaker 20 mounted on the rear side of the cover part 200 or when the mobile terminal is in the closed station via the receiver 10.

Figure 5:
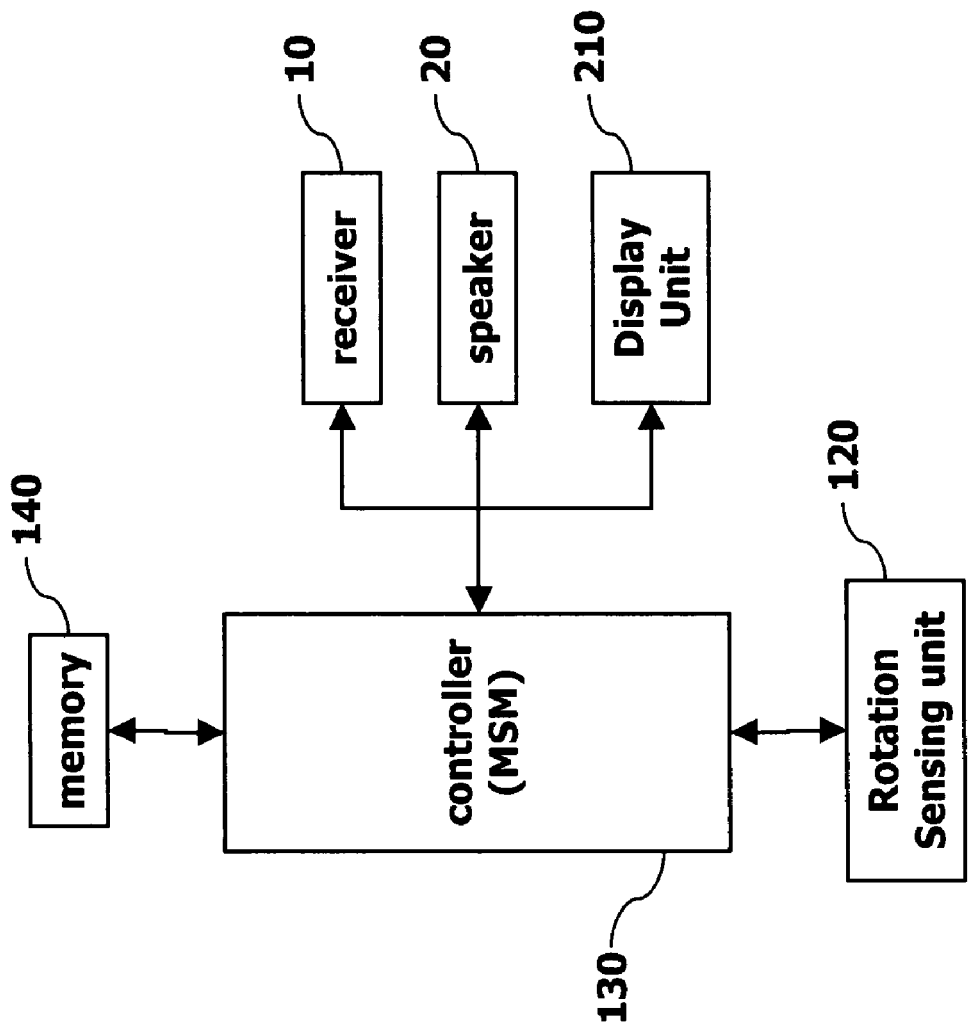
FIG. 5 is a block diagram of a dual voice outputting system according to the present invention.

Next, FIG. 5 illustrates a block diagram of a dual voice outputting system according to the present invention. As shown, the dual voice outputting system includes the receiver 10 positioned at a front side of the cover part 200 and for outputting a received voice, sound etc.; the speaker 20 positioned at a rear side of the cover part 200 and for outputting the received voice, sound etc.; a rotation sensing unit 120 for checking a rotated state of the cover part 200; and a controller 130 for outputting the received voice, sound etc. to the receiver 10 or the speaker 20 according to the checked rotated state of the cover part 200 when a user responds to a call. The system also includes a memory 140 for storing a sound pressure conversion table, which will be discussed later. Further, in one example, the speaker 20 is mounted at the same position of the rear side of the cover part 200 as the receiver 10 as shown in FIG. 4, for example.

Figure 6:
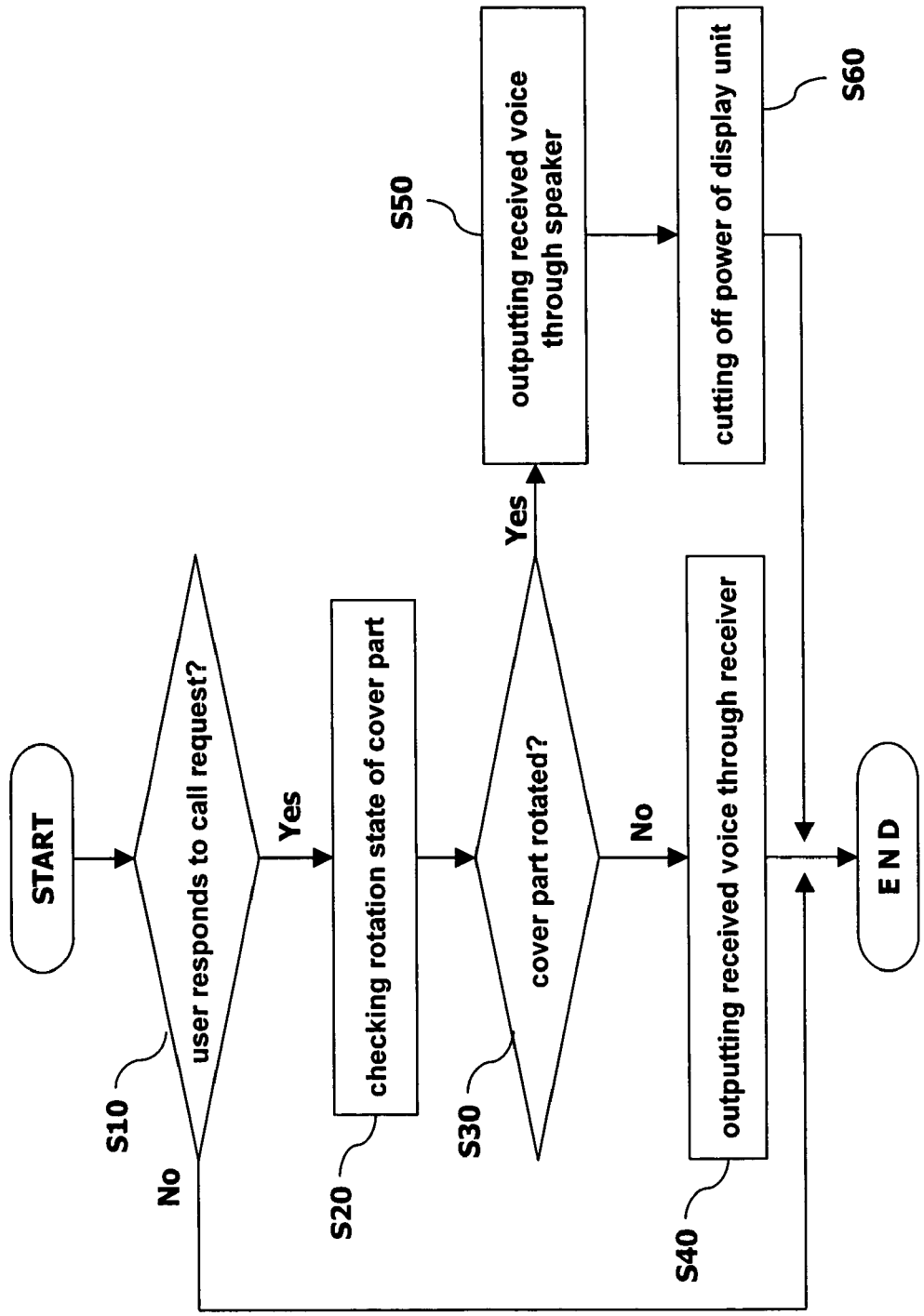
FIG. 6 is a flowchart illustrating an operation of the dual voice outputting system according to the present invention.

Turning now to FIG. 6, which is a flowchart illustrating an operation of the mobile terminal according to the present invention. As shown in step S10, it is determined whether or not the user responds to an incoming call. When the user responds to the call by opening the cover part 200, for example (Yes in step S10), the controller 130 (see FIG. 5) checks a rotated state of the cover part 200 through the rotation sensing unit 120 (step S20). Namely, the controller 130 checks whether the mobile terminal is in the rear side opened state or the front side opened state.

If the mobile terminal is in the front side opened state (No in step S30), the controller 130 outputs the received voice via the receiver 10. If, however, the mobile terminal is in the rear side opened state (Yes in step S30), the controller 130 outputs the received voice through the speaker 20 positioned at the rear side of the cover part 200 (step S50).

In this instance, the controller 130 controls a volume level (or power level) of the speaker 20 with reference to the sound pressure conversion table stored in the memory 140. In general, the speaker 20 has a higher output than the receiver 10, and a sound pressure of the speaker 20 and that of the receiver 10 are different from each other at the same volume level. Thus, the controller 130 controls the volume level of the speaker 20 so that the sound pressure of the speaker 20 can be the same or similar to the sound pressure of the receiver 10. That is, the sound pressure conversion table includes information which allows the controller 130 to select a volume level for the speaker 20 that produces a similar sound pressure as the receiver 10.

Further, as shown in step S60, the controller 130 advantageously turns off the power supply of the display unit when the incoming call is being output via the speaker 20. Namely, if the cover part 200 is rotated by 180° while the user is communicating with the caller, there is a possibility that personal information of the user on the display unit can be exposed to others. Therefore, the controller 130 advantageously turns off the display unit for the privacy of the user.

As so far described, the dual voice outputting system of a mobile terminal has the following advantages.

For example, the user is advantageously able to communicate when the mobile terminal is in the rear side opened state as well as in the front side opened state. In addition, the user does not need to manipulate the mobile terminal using both hands to answer a phone call. Further, the display is advantageously turned off when the display is facing outwards to prevent other people from seeing information on the display.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A dual voice outputting system of a folder type terminal having a cover part, a body part, and a swivel hinge configured to allow the cover part to rotate with respect to the body part about a longitudinal axis of the cover part, the system comprising:
    a first output device positioned on a front side of the cover part and configured to output a received voice or sound;
    a second output device positioned on a rear side of the cover part and configured to output the received voice or sound;
    a rotation sensor configured to check a swivel rotated state of the cover part; and
    a controller configured to output the received voice or sound to the first or second output device based on the checked rotated state of the cover part when a user responds to an incoming call, wherein the first output device and the second output device are selectively operated according to the checked rotated state of the cover part when the cover part is in an open state, wherein the swivel hinge rotates in a direction perpendicular to a front surface of the cover part functioning as a hinge to open and close the cover part, and wherein the second output device is controlled with reference to a sound pressure conversion table stored in a memory.

2. The system of claim 1, wherein if the cover part is not rotated, the controller outputs the received voice or sound to the first output device, and if the cover part is rotated, the controller outputs the received voice or sound to the second output device.

3. The system of claim 2, wherein the controller turns off a power supply to a display device of the terminal when the cover part is rotated to face away from the user.

4. The system of claim 1, wherein if the cover part is rotated, the controller adjusts an output level of the second output device such that a sound pressure from the second output device is substantially the same as for the first output device.

5. The system of claim 1, wherein the second output device is positioned on the rear side of the cover part at a corresponding same position as the receiver on the front side of the cover part.

6. The system of claim 1, further comprising:
    the memory which stores the sound pressure conversion table which includes sound pressure values for the second output device relative to sound pressure values for the fast output device.

7. The system of claim 6, wherein if the cover part is rotated, the controller adjusts the output level of the second output device such that the sound pressure from the second output device is substantially the same as for the first output device.

8. The system of claim 1, wherein the first output device is a receiver and the second output device is a speaker.

9. A mobile terminal having a swivel hinge configured to allow a cover part to rotate with respect to a body part about a longitudinal axis of the cover part, the mobile terminal comprising:
the cover part having a first output device on a first side and a second output device on a second side opposite to the fast side such that a user can receive information via the first output device when the cover part is not rotated about the longitudinal axis and can receive information via the second output device when the cover part is rotated, wherein the first output device and the second output device are selectively operated according a checked rotated state of the cover part when the cover part is in an open state, wherein the swivel hinge rotates in a direction perpendicular to a front surface of the cover part functioning as a hinge to open and close the cover part, and wherein the second output device is controlled with reference to a sound pressure conversion table stored in a memory.

10. The terminal of claim 9, further comprising:
a rotation sensor configured to check whether the cover part is rotated about the longitudinal axis; and
a controller configured to output the received information to the first or second output device based on the checked rotated state of the cover part.

11. The terminal of claim 10, wherein if the cover part is not rotated, the controller outputs the received information to the first output device, and if the cover part is rotated, the controller outputs the received information to the second output device.

12. The terminal of claim 11, wherein the controller turns off a power supply to a display device of the terminal when the cover part is rotated to face away from the user.

13. The terminal of claim 10, wherein if the cover part is rotated, the controller adjusts the output level of the second output device such that the sound pressure from the second output device is substantially the same as for the first output device.

14. The terminal of claim 10, wherein the second output device is positioned on a rear side of the cover part at a corresponding same position as the first output device on a front side of the cover part.

15. The terminal of claim 10, further comprising:
the memory which stores the sound pressure conversion table which includes sound pressure values for the second output device relative to sound pressure values for the first output device.

16. The terminal of claim 15, wherein if the cover part is rotated, the controller adjusts the output level of the second output device such that the sound pressure from the second output device is substantially the same as for the first output device.

17. The terminal of claim 10, wherein the fast output device is a receiver and the second output device is a speaker.

18. The terminal of claim 9, wherein the received information is a sound or voice information.

19. A mobile terminal having a folding part, a main body part, and a swivel hinge, the mobile terminal comprising:
a sensor configured to determine if the folding part is rotated about its own longitudinal axis; and
a controller configured to output information via different output devices based on whether the folding part is rotated, wherein if the folding part is rotated, the controller adjusts an output level of the output devices such that a sound pressure from the devices are substantially the same, wherein the different output devices are selectively operated according the checked rotated state of the hider part when the folder part is in an open state, wherein the swivel hinge rotates in a direction perpendicular to a front surface of the folder part functioning as a hinge to open and close the folder part, and wherein at least one of the different output devices is controlled with reference to a sound pressure conversion table stored in a memory.

20. The terminal of claim 19, wherein the different output devices comprise a first output device on a first side of the folding part and a second output device on a second side of the folding part, and wherein if the folding part is not rotated, the controller outputs the received information to the first output device, and if the folding part is rotated, the controller outputs the received information to the second output device.

21. The terminal of claim 20, wherein if the folding part is rotated, the controller adjusts the output level of the second output device such that the sound pressure from the second output device is substantially the same as for the first output device.

22. The terminal of claim 20, wherein the second output device is positioned on a rear side of the folding part at a corresponding same position as the first output device on a front side of the folding part.

23. The terminal of claim 20, further comprising:
the memory which stores the sound pressure conversion table which includes sound pressure values for the second output device relative to sound pressure values for the first output device.

24. The terminal of claim 23, wherein the folding part is rotated, the controller adjusts the output level of the second output device such that the sound pressure from the second output device is substantially the same as for the first output device.

25. The terminal of claim 20, wherein the fast output device is a receiver and the second output device is a speaker.

26. The terminal of claim 19, wherein the controller turns off a power supply to a display device of the terminal when the folding part is rotated to face away from the user.

27. The terminal of claim 19, wherein the information is a sound or voice information.

* * * * *